United States Patent
Kuravangi-Thammaiah et al.

(10) Patent No.: US 12,219,087 B2
(45) Date of Patent: Feb. 4, 2025

(54) SYSTEMS AND METHODS FOR REGIONAL SEGMENTATION AND SELECTION OF CHARGING FUNCTION

(71) Applicant: Verizon Patent and Licensing Inc., Basking Ridge, NJ (US)

(72) Inventors: Shanthala Kuravangi-Thammaiah, Keller, TX (US); Madhan Muralimanohar, Tampa, FL (US); Violeta Cakulev, Millburn, NJ (US); Jerry Steben, Fort Worth, TX (US); Harinder S. Lakhian, Plano, TX (US); Muthukumar Retnasamy, Tampa, FL (US); Hans Raj Nahata, New Providence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 498 days.

(21) Appl. No.: 17/406,617

(22) Filed: Aug. 19, 2021

(65) Prior Publication Data

US 2023/0057651 A1 Feb. 23, 2023

(51) Int. Cl.
*H04M 15/00* (2024.01)
*H04W 8/18* (2009.01)
*H04W 60/00* (2009.01)
*H04W 84/04* (2009.01)

(52) U.S. Cl.
CPC .......... *H04M 15/66* (2013.01); *H04W 8/18* (2013.01); *H04W 60/00* (2013.01); *H04W 84/042* (2013.01)

(58) Field of Classification Search
CPC ... H04M 15/66; H04M 15/8228; H04W 8/18; H04W 60/00; H04W 84/042; H04W 4/24; H04L 12/1407
See application file for complete search history.

(56) References Cited

U.S. PATENT DOCUMENTS

| | | | |
|---|---|---|---|
| 2019/0357294 A1* | 11/2019 | Ha | H04W 76/15 |
| 2021/0368306 A1* | 11/2021 | Garcia Azorero | H04M 15/66 |
| 2022/0247827 A1* | 8/2022 | Das | G06F 11/1423 |
| 2022/0322053 A1* | 10/2022 | Das | H04L 41/0893 |

FOREIGN PATENT DOCUMENTS

WO WO-2021083534 A1 * 5/2021 ............. H04L 47/20

OTHER PUBLICATIONS

3Gpp TS 123 501 V16.6.0 (Oct. 2010); Title: 5G; System architecture for the 5G System (5GS) (3gPP TS 23.501 version 16.6.0 Release 16) (Year: 2020).*

* cited by examiner

*Primary Examiner* — Marisol Figueroa

(57) ABSTRACT

Systems and methods described herein enable distribution of a Charging Function group identifier ("CHF-Group-ID") and other CHF selection data to CHF consumers during Protocol Data Unit (PDU) session establishment in a 5G network. A Unified Data Repository (UDR) is provisioned with CHF-Group-ID details for each subscriber of the network. In one aspect, during PDU session establishment, CHF consumers obtain CHF-Group-ID information as part of a subscriber profile that is provided to all CHF consumers. No additional step or hop is needed for the CHF consumers to obtain the CHF-Group-ID. Thus, regionally segmented CHFs can be implemented without replication of data between CHFs in different regional segments and without additional signaling between network functions.

20 Claims, 15 Drawing Sheets

400

| Field | Description |
|---|---|
| 402 Service-Type | Specify the services current CHF instance support, e.g., voice, messaging, data, etc. |
| 404 User-Type | Specify the type of the subscribers hosted on current CHF instance, e.g., IOT users, Public safety users, etc. |
| 406 Service-Provider | Specify the service providers of subscribers hosted on the CHF. |
| 408 Device-Type | Specify the device-type of subscribers hosted on the CHF, e.g., smartphone, fixed wireless, etc. |
| 410 Vendor-ID | Specify the provider/retailer of the current CHF instance. |
| 412 Charging-Event-Type | Specify charging events that current CHF instance processes, e.g., session based charging, event based charging, etc. |
| 414 Charging-Type | Specify the charging type that current CHF instance processes, e.g. quota-management, offline only, etc. |
| 416 CHF-Group-ID | Internal CHF Group |
| 418 Extension | For future use |

FIG. 4

SYSTEMS AND METHODS FOR REGIONAL SEGMENTATION AND SELECTION OF CHARGING FUNCTION

BACKGROUND

Fifth Generation (5G) mobile networks, are being implemented as the next stage networks in the evolution of mobile wireless networks. 5G networks may use different frequencies, different radio access technologies, and different core network functions than legacy wireless networks (e.g., Fourth Generation (4G) networks). For example, 5G networks implement a converged charging system (CCS) that relies, in part, on a Charging Function (CHF).

BRIEF DESCRIPTION OF THE DRAWINGS

FIG. 4 is a diagram illustrating a table of example types of CHF selection data;

DETAILED DESCRIPTION OF EXAMPLE EMBODIMENTS

Figure 1:
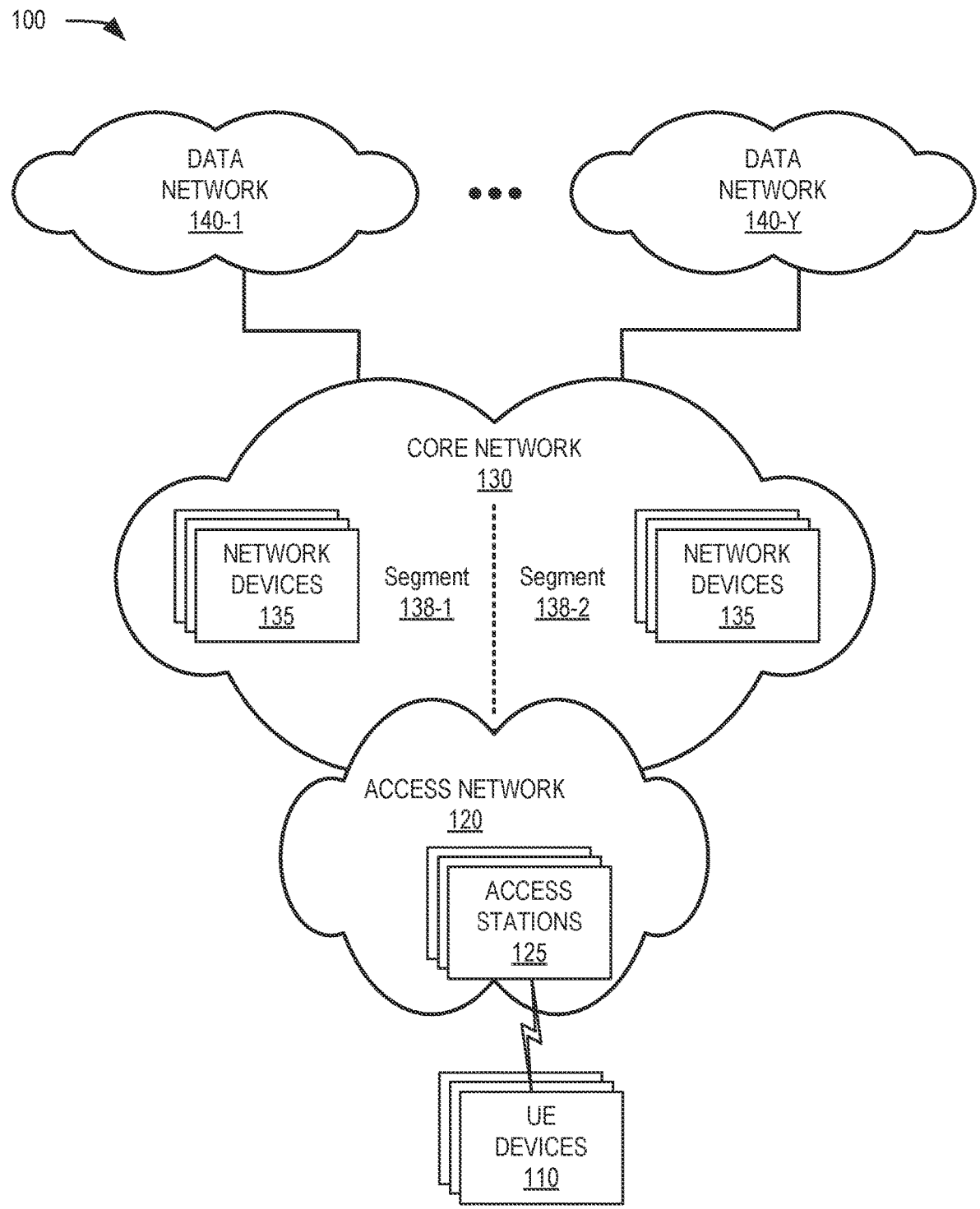
FIG. 1 is a diagram illustrating an example network environment in which regional segmentation and selection of charging function (CHF) instances may be implemented.

The following detailed description refers to the accompanying drawings. The same reference numbers in different drawings may identify the same or similar elements.

5G network functions may use regional/zonal segmentation to limit subscriber data replication across a national network, prevent nationwide network outages due to network traffic error, and reduce network traffic flow and transactions across the national network. Segmentation may be implemented using various approaches. For example, one approach may segment network functions in a national 5G network into two segments (e.g., an east segment and a west segment), where network functions in one segment may not replicate/synchronize data with network functions in the other segment. In another approach, main segments may be divided into multiple regional zones (e.g., two or three zones per segment).

In 5G networks, a primary responsibility of the charging function (CHF) is to collect network charging data from other network functions. The CHF may store a subscriber profile and associate the network charging data with the subscriber profile in a record called a network currency consumption counter (also referred to as a "counter"). In some core network configurations, such as where there is segmentation, multiple instances of the CHF may be employed. To provide accurate real-time consumption tracking and minimize data replication, the subscriber profile and counter need to be maintained in a single CHF instance or a limited group of CHF instances within the same segment.

A CHF group identifier (referred to as a "CHF-Group-ID") has been previously introduced to associate different CHF instances based on a region, device type, subscriber group, etc. Use of the CHF-Group-ID has been defined for other 5G network functions (namely, the Network Repository Function (NRF) and CHF) to handle the registration of the CHF at the NRF and to handle discovery of CHF via the NRF by other 5G network functions.

When there are multiple CHF groups in a network, network functions that report network data to the CHF (referred to herein as "CHF consumers") need to be able to use the CHF-Group-ID to discover the appropriate CHF instance and send network traffic data. However, no standards based definitions are currently in place for CHF consumers to understand or make use of the CHF-Group-ID. Particularly, current network configuration standards do not define a way for CHF consumers to obtain the appropriate CHF-Group-ID while fetching a subscriber profile.

Systems and methods described herein enable distribution of a CHF-Group-ID and other CHF selection data to CHF consumers during Protocol Data Unit (PDU) session establishment in a 5G network. According to an implementation, a Unified Data Repository (UDR) may be provisioned with CHF-Group-ID details for each subscriber of the network. During PDU session establishment, CHF consumer may obtain CHF-Group-ID information as part of a subscriber profile that is provided to all CHF consumers. No additional step or hop is needed for the CHF consumers to obtain the CHF-Group-ID. Thus, regionally segmented CHFs may be implemented without replication of data between CHFs in different regional segments and without additional signaling between network functions.

According to another implementation, the UDR may be provisioned with CHF-Group-ID details for each subscriber of the network as part of CHF selection data. During PDU session establishment, a CHF consumer may subscribe to the CHF selection data to obtain CHF-Group-ID information in addition to the subscriber profile that is provided to all CHF consumers. An additional step or hop may be made by the CHF consumers to subscribe and obtain the CHF-Group-ID. Thus, regionally segmented CHFs may be implemented without replication of data between CHFs in different regional segments and without additional signaling between network functions.

FIG. 1 is a diagram of an example environment 100 in which the systems and/or methods described herein may be implemented. As shown in FIG. 1, environment 100 may include UE devices 110, a radio access network (RAN) 120 that includes access stations 125, a core network 130 that includes network devices 135, and data networks (DNs) 140-1 to 140-Y (referred to herein collectively as "DNs 140" and individually as "DN 140").

UE device 110 may include a device with cellular wireless communication functionality. For example, UE device 110 may include a handheld wireless communication device (e.g., a smart phone, etc.), a wearable computer device (e.g., a wristwatch computer device, etc.), a computer; a WiFi access point, a portable gaming system, an Internet-of-Things device, a fixed wireless access station, and/or any other type of computer device with wireless communication capabilities. UE device 110 may include capabilities for voice communication, mobile broadband services (e.g., video streaming, real-time gaming, premium Internet access etc.), best effort data traffic, and/or other types of applications. UE device 110 may be associated with a subscriber/account for using services of access network 120 and/or core network 130.

Access network 120 may enable UE devices 110 to connect to core network 130 via access stations 125 using cellular wireless signals. Access station 125 may include a 5G New Radio (NR) base station (e.g., a gNodeB) and/or a Fourth Generation (4G) Long Term Evolution (LTE) base station (e.g., an eNodeB). Each access station 125 may include devices and/or components configured to enable cellular wireless communication with UE devices 110. For example, access station 125 may include a radio frequency (RF) transceiver configured to communicate with UE devices using a 5G NR air interface, a 4G LTE air interface, and/or using another type of cellular air interface. Access station 125 may enable communication with core network 130, to allow, for example, authenticating UE device 110 or monitoring network activity of UE device 110. According to one implementation, access network 120 may include a non-standalone (NSA) network to support dual coverage using 4G and 5G networks. In another implementation, access network 120 may include a 5G standalone (SA) network.

Core network 130 may be managed by a provider of cellular wireless communication services and may manage communication sessions of subscribers connecting to core network 130 via access network 120. Core network 130 may include one or multiple networks of different types and technologies. For example, core network 130 may be implemented to include a next generation core (NGC) network for a 5G network, an Evolved Packet Core (EPC) of an LTE network, an LTE-A network, an LTE-A Pro network, another type of 4G core network, and/or a legacy core network.

Core network 130 may include various network devices 135. Depending on the implementation, network devices 135 may include 5G core network components (e.g., a User Plane Function (UPF), an Access and Mobility Management Function (AMF), a Session Management Function (SMF), a Unified Data Management (UDM) function, a Network Slice Selection Function (NSSF), a Policy Control Function (PCF), a Unified Data Repository (UDR) etc.), 4G core network components (e.g., a Serving Gateway (SGW), a Packet Data Network Gateway (PGW), a Mobility Management Entity (MME), a Home Subscriber Server (HSS), etc.), or another type of core network components (e.g., future 6G network components). In other implementation, network devices 135 may include combined 4G and 5G functionality, such as a session management function with PDN gateway-control plane (SMF+PGW-C) and a user plane function with PDN gateway-user plane (UPF+PGW-U).

Network device 135 may include a physical function node or a virtual network function (VNF). Thus, the components of core network 130 may be implemented as dedicated hardware components and/or as VNFs implemented on top of a commonly shared physical infrastructure using Software Defined Networking (SDN). The shared physical infrastructure may be implemented using one or more devices 1100 described below with reference to FIG. 11 in a distributed computing center associated with core network 130. Additionally, or alternatively, some, or all, of the shared physical infrastructure may be implemented using one or more devices 1100. According to an implementation, some network functions executed on network devices 135 may be regionally segmented, as part of segments 138-1 and 138-2. A segmented network function in one segment 138 may not replicate and/or synchronize data with a segmented network function in another segment.

DNs 140 may each include a data network, such as a packet data network. A particular DN 140 may be associated with an Access Point Name (APN) and UE device 110 may request a connection to the particular packet data network 140 using the APN. DN 140 may include, and/or be connected to, and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows example components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2A:
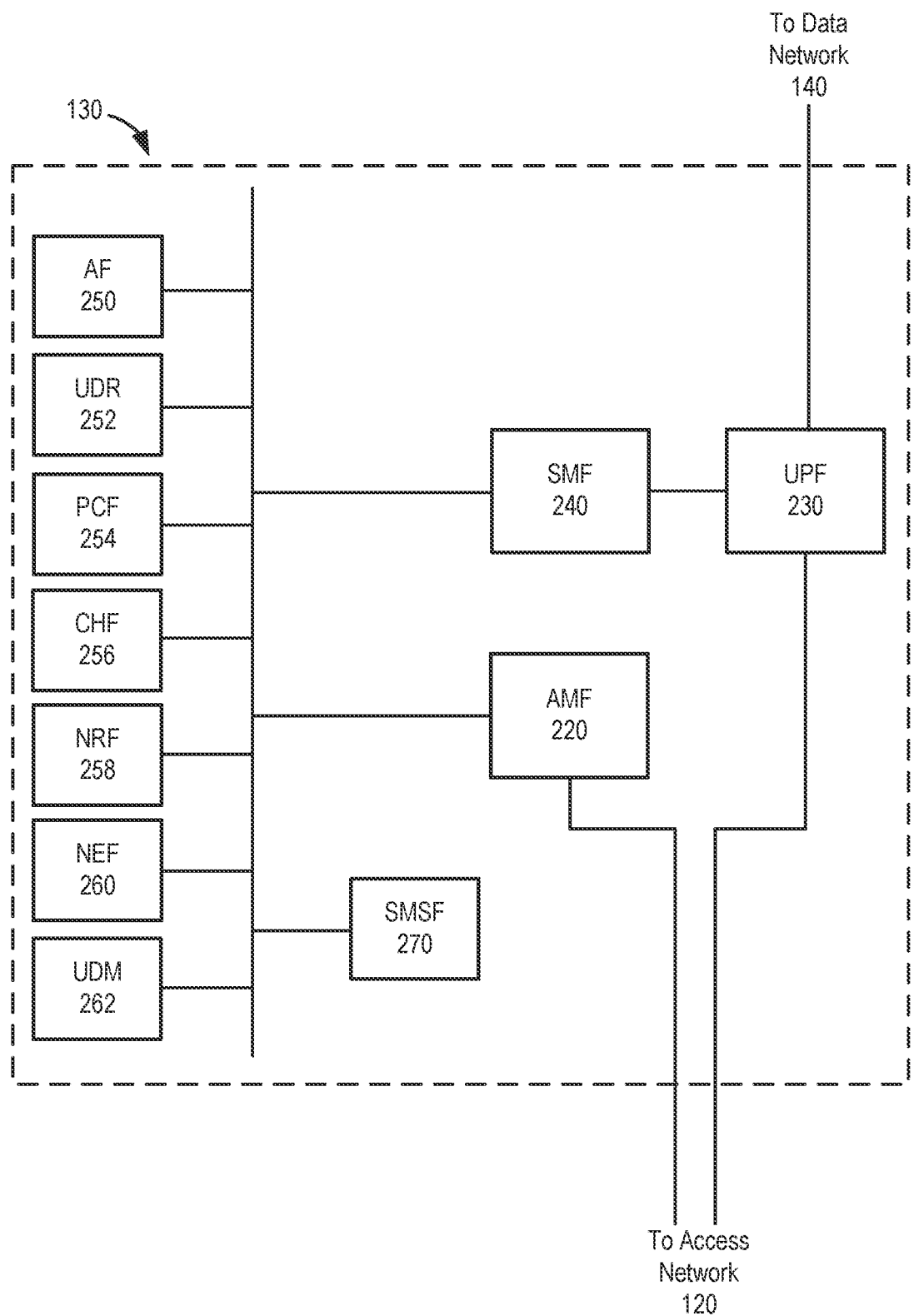
FIG. 2A is a diagram illustrating example elements of a core network, according to an implementation described herein.

FIG. 2A is a diagram illustrating example elements of core network 130, according to an implementation described herein. As shown in FIG. 2A, core network 130 may include an AMF 220, a UPF 230, an SMF 240, an Application Function (AF) 250, a UDR 252, a PCF 254, a CHF 256, a Network Repository Function (NRF) 258, a Network Exposure Function (NEF) 260, a UDM function 262, a Short Message Service Function (SMSF) 270.

The components depicted in FIG. 2 may correspond to one or more of network devices 135 and may be implemented as dedicated hardware components or as virtualized functions implemented on top of a common shared physical infrastructure using software-defined networking (SDN). For example, an SDN controller may implement one or more of the components of FIG. 2A using an adapter implementing a virtual network function (VNF) virtual machine, an event driven serverless architecture interface, and/or another type of SDN architecture. The common shared physical infrastructure may be implemented using one or more devices 1100 described below with reference to FIG. 11 in a cloud computing center associated with core network 130.

AMF 220 may perform registration management, connection management, reachability management, mobility management, lawful intercepts, SMS transport between UE device 110 and SMSF 270, session management messages transport between UE device 110 and SMF 240, access authentication and authorization, location services management, functionality to support non-3GPP access networks, and/or other types of management processes.

UPF 230 may maintain an anchor point for intra/inter-RAT mobility, maintain an external PDU point of interconnect to a particular data network 140, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., access station 125), and/or perform other types of user plane processes.

SMF 240 may perform session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, terminate interfaces toward PCF 254, perform lawful intercepts, charge data collection, support charging interfaces, control and coordinate of charging data collection, terminate session management parts of NAS messages, perform downlink data notification, manage roaming functionality, and/or perform other types of control plane processes for managing user plane data.

AF 250 may provide services associated with a particular application, such as, for example, an application for influencing traffic routing, an application for accessing NEF 260, an application for interacting with a policy framework for policy control, and/or other types of applications.

UDR 252 may provide a unified data structure that is accessible to a number of functional elements. For example, UDR 252 may support storage and retrieval of subscription data by UDM 262, storage and retrieval of policy data by PCF 254, storage and retrieval of structured data for exposure, and application data by NEF 260. According to implementations described herein, UDR 252 may store CHF selection data (also referred to herein as "CHF-select-data") in a shared data structure to enable selection of an appropriate instance of a CHF 256. CHF-select-data is described further in connection with FIG. 4, for example. UDR 252 may provide CHF-select-data to functions subscribed to UDR services (referred to herein as "subscribers"), such as PCF 254 and UDM 262. Additionally, UDR 252 may receive updates to CHF-select-data and notify PCF 254 and UDM 262 of such updates.

PCF 254 may support policies to control network behavior, provide policy rules to control plane functions (e.g., to SMF 240), access subscription information relevant to policy decisions, perform policy decisions, and/or perform other types of processes associated with policy enforcement. According to implementations described herein, PCF 254 may be configured to subscribe to UDR services, for example, to receive CHF-select-data and update notifications from UDR 252.

CHF 256 may perform charging and/or billing functions for core network 130. For example, CHF 256 may collect network charging data from other network functions, such as SMF 240, SMSF 270, etc. and maintain a network currency consumption counter. CHF 256 may store a subscriber profile and network charging data to compute the network currency consumption counter. In a configuration where core network 130 includes multiple instances of CHF 256 due to CHF segmentation, the subscriber profile and network currency consumption counter needs to be maintained the same CHF instance or a home CHF instance needs to be designated to ensure complete and non-duplicative consumption count.

NRF 258 may support a service discovery function and maintain profiles of available network function (NF) devices/instances and their supported services. An NF profile may include an NF instance identifier (ID), an NF type, a Public Land Mobile Network (PLMN) ID associated with the network, a Subscription Permanent Identifier (SUPI) associated with the UE device, a Generic Public Subscription Identifier (GPSI) associated with the UE device, network slice IDs associated with the NF, capacity information for the NF, service authorization information for the NF, supported services associated with the NF, endpoint information for each supported service associated with the NF, and/or other types of NF information.

NEF 260 may expose capabilities and events to other NFs, including third party NFs, AFs, edge computing NFs, and/or other types of NFs. Furthermore, NEF 258 may secure provisioning of information from external applications to core network 130, translate information between core network 130 and devices/networks external to core network 130, support a Packet Flow Description (PFD) function, and/or perform other types of network exposure functions.

UDM 262 may maintain subscription information for UE devices 110, manage subscriptions, generate authentication credentials, handle user identification, perform access authorization based on subscription data, perform NF registration management, maintain service and/or session continuity by maintaining assignment of SMF 240 for ongoing sessions, support SMS delivery, support lawful intercept functionality, and/or perform other processes associated with managing user data. UDM 262 may be a stateless network function. According to implementations described herein, UDM 262 may retrieve from the UDR 252 access management (AM) subscription data, session management (SM) subscription data, and short message service (SMS) subscription data which contain the CH-Group-ID. According to another implementation, UDM 262 may retrieve CHF selection data from UDR 252 and propagate this information to CHF consumers.

SMSF 270 may perform SMS services for UE devices 110 and generate records related to SMS delivery.

Figure 2B:
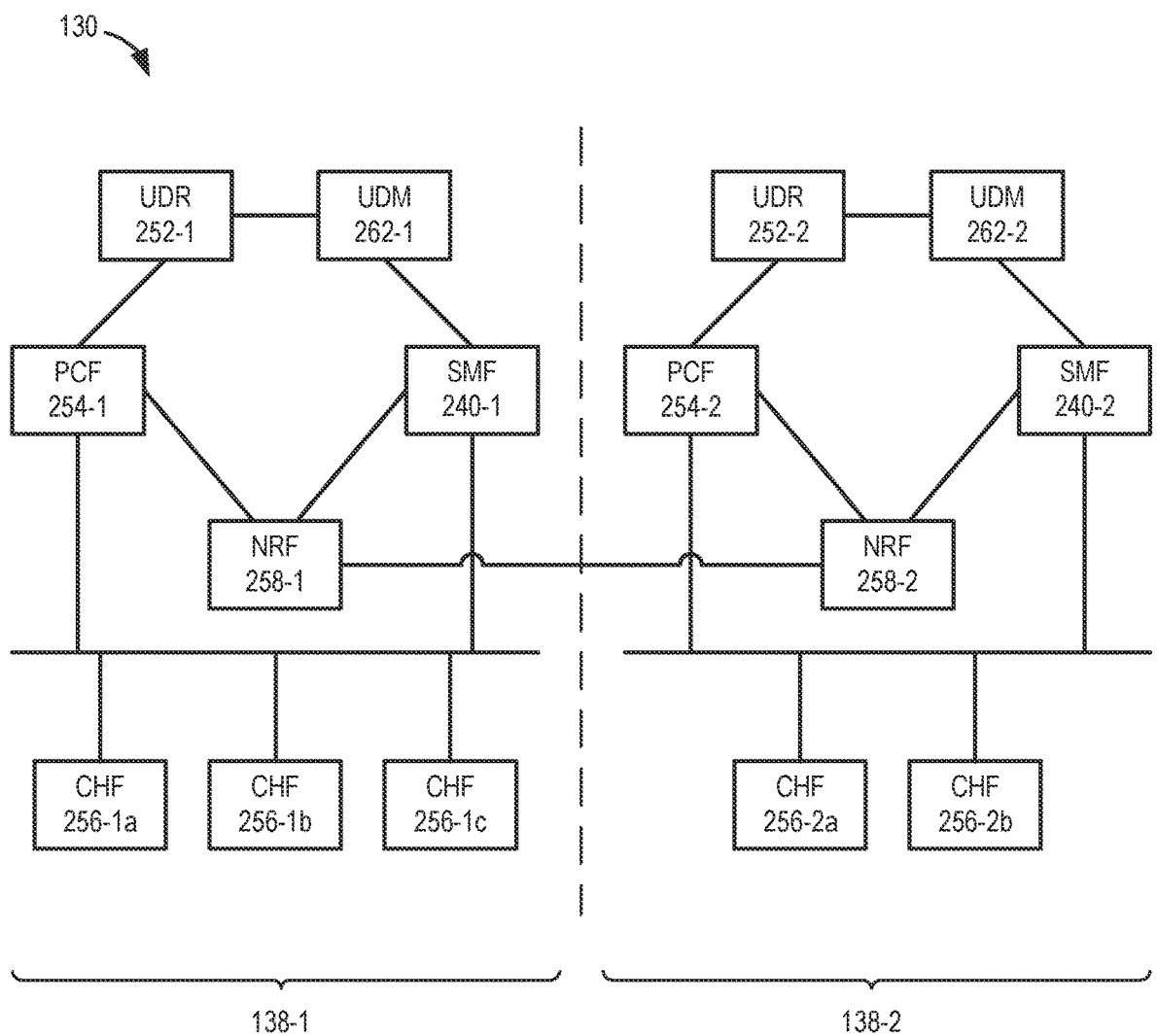
FIG. 2B is a diagram illustrating example elements of a core network in a segmented configuration, according to an implementation described herein.

FIG. 2B is a diagram illustrating example elements of core network 130 in a segmented configuration, according to an implementation described herein. In the configuration of FIG. 2B, core network 150 may include network segment 138-1 and network segment 138-2. Network segment 138-1 may include SMF 240-1, UDR 252-1, PCF 254-1, NRF 258-1 and UDM 262-1. Network segment 138-1 may also include a group of CHFs 256-1 (e.g., CHF 256-1*a*, CHF 256-1*b*, and CHF 256-1*c*). Network segment 138-2 may include SMF 240-2, UDR 252-2, PCF 254-2, NRF 258-2 and UDM 262-2. Network segment 138-2 may also include a group of CHFs 256-2 (e.g., CHF 256-2*a*, and CHF 256-2*b*).

Network segment 138-1 and network segment 138-2 may be associated with different geographic regions. Each SMF 240 and PCF 254 (and other CHF consumers, not shown) for each network segment 138 may be associated with a CHF group, via a CHF-Group-ID. In one implementation, subscriber data is not replicated between regionally segmented groups of CHFs 256 with different CHF-Group-IDs (e.g., CHF 256-1 and 256-2). However, each UDR 252 (e.g., UDR 252-1 and 252-2) may be provisioned with CHF-Group-ID details for every subscriber UE (e.g., every subscription permanent identifier (SUPI)).

To implement segmentation of CHF 256, a CHF-Group-ID may be used for each segmented group of CHFs 256-1 and 256-2 to discover and send the network traffic data to the appropriate (or home) CHF instance. Previously, the CHF-Group-ID has not been specifically defined for use by the UDR 262, such that other network functions (such as a PCF 254 and SMF 240) could obtain the CHF-Group-ID while fetching a subscriber profile. Instead, the CHF-Group-ID was only accessible through a NRF 258. According to an implementation described herein, during PDU session establishment, UDM 262 and UDR 252 will pass the CHF-Group-ID info as part of a subscriber profile to all CHF consumers, such as SMF 240 (from UDM 262) and PCF 254 (from UDR 252). Thus, the CHF-Group-ID is obtained by the CHF consumers as part of the PDU session establishment procedure, and no additional step is necessary to obtain the appropriate CHF-Group-ID. According to another implementation described herein, UDR 252 may be provisioned with CHF-select-data that includes a CHF-Group-ID for each subscriber. During PDU session establishment, a CHF consumer, such as SMF 240 or PCF 254, may subscribe to the CHF-select-data to obtain CHF-Group-ID information from UDM 262/UDR 252 in addition to the subscriber profile that is provided to all CHF consumers.

Figure 2C:
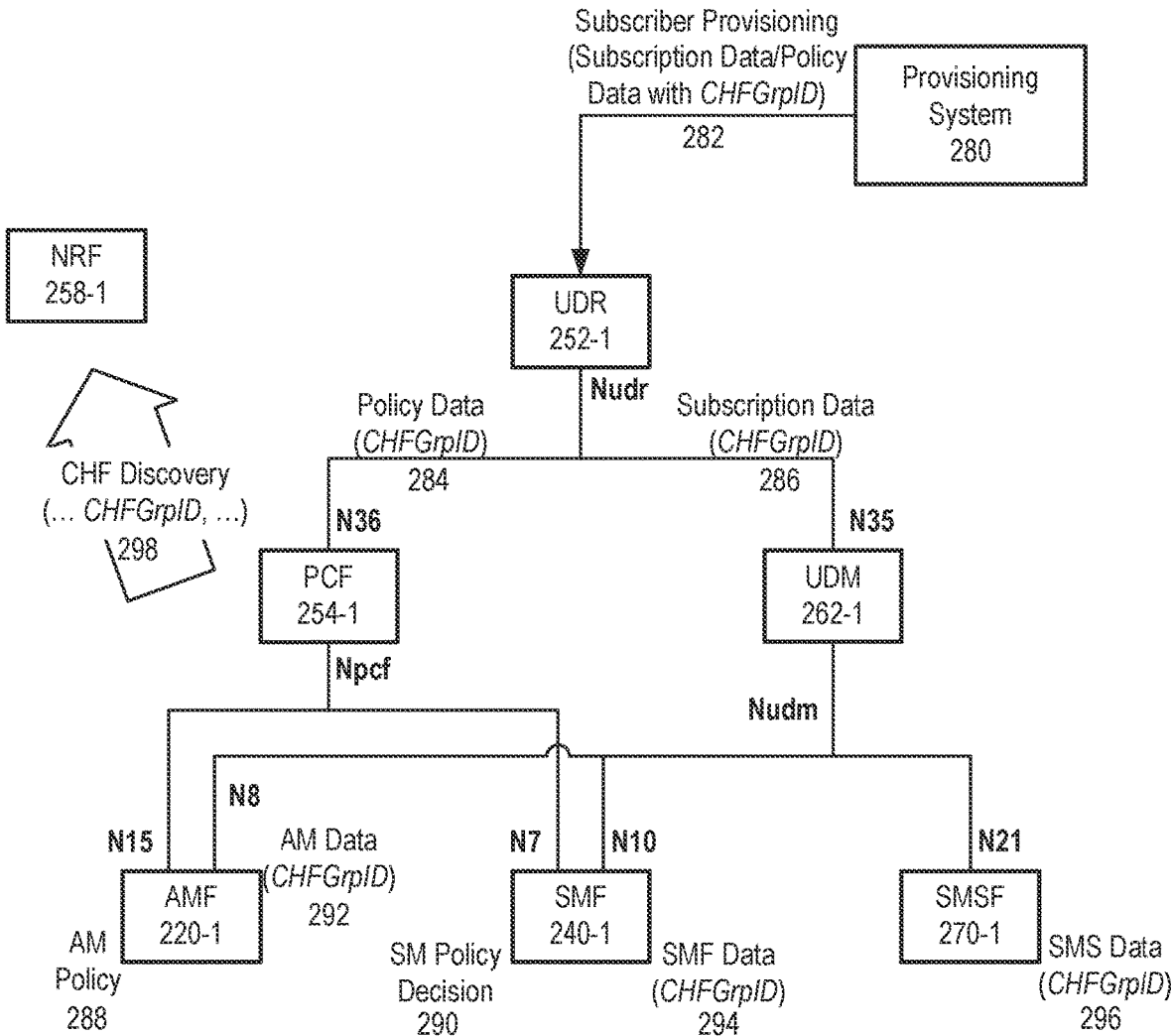
FIG. 2C is a diagram illustrating an example of a subscriber data profile flow to propagate a CHF group identifier in a segment of a core network.

FIG. 2C is a diagram illustrating an example flow to propagate a CHF-Group-ID to CHF consumers as part of a subscriber profile in a portion of segment 138-1 of core network 130. Similar communications may be used in other core network segments (e.g., segment 138-2). In the example of FIG. 2C, segment 138-1 may include AMF 220-1, SMF 240-1, UDR 252-1, PCF 254-1, NRF 258-1, UDM 262-1, SMSF 270-1, and a provisioning system 280. Each of AMF 220-1, SMF 240-1, UDR 252-1, PCF 254-1, NRF 258-1, UDM 262-1, and SMSF 270-1 may communicate through structured interfaces (e.g., Nudr, Npcf, Nudm, N35, N36, etc.) modified as described below.

As shown in FIG. 2C, provisioning system 280 may include a network device that performs subscriber provisioning 282 for UDR 252-1. Subscriber provisioning 282 may provide, for example, access management (AM) subscription data, session management (SM) subscription data, and short message service (SMS) subscription data (referred to collectively as "subscription data"), policy data, structured data for exposure, and application data. According to implementations described herein, provisioning may include a CHF-Group-ID in the subscriber profile. UDR 252-1 may receive and store the CHF-Group-ID in the subscriber profile.

UDR 252-1 may pass policy data 284 to PCF 254-1 and subscription data 286 to UDM 262-1. Policy data 284 may include the CHF-Group-ID, which may be stored by PCF 254-1. Particularly, PCF 254-1 may be configured to receive the CHF-Group-ID via a modified N36-Nudr interface. Using policy data 284, PCF 254-1 may provide an AM policy 288 to AMF 220-1 and an SM policy decision 290 to SMF 240-1. However, AM policy 288 and SM policy decision 290 may not necessarily include the CHF-Group-ID, since, as described below, AMF 220-1 may receive the CHF-Group-ID with access management (AM) data from UDM 262-1. Subscription data 286 may include the CHF-Group-ID, which may be retrieved by UDM 262-1 from UDR 252-1. UDM 262-1 may be configured to receive the CHF-Group-ID via a modified N35-Nudr interface.

UDM 262-1 may provide the CHF-Group-ID for a subscriber to each of AMF 220-1, SMF 240-1, and SMSF 270-1. UDM 262-1 may provide the CHF-Group-ID to AMF 220-1 as part of AM data 292. AMF 220-1 may be configured to receive the CHF-Group-ID via a modified N8-Nudm interface. UDM 262-1 may provide the CHF-Group-ID to SMF 240-1 as part of SMF data 294. SMF 240-1 may be configured to receive the CHF-Group-ID via a modified N10-Nudm interface. UDM 262-1 may provide the CHF-Group-ID to SMSF 270-1 as part of SMS data 296. SMSF 270-1 may be configured to receive the CHF-Group-ID via a modified N21-Nudm interface. As shown at reference 298 of FIG. 2C, each CHF consumer (e.g., AMF 220-1, PCF 254-1, SMF 240-1, and SMSF 270-1) may be configured to use the CHF-Group-ID for CHF discovery with NRF 258-1.

Although FIGS. 2A-2C show exemplary components of core network 130, in other implementations, core network 130 may include fewer components, different components, differently arranged components, or additional components than depicted in FIGS. 2A-2C. Additionally or alternatively, one or more components of core network 130 may perform functions described as being performed by one or more other components of core network 130. For example, core network 130 may include additional function nodes not shown in FIGS. 2A-2C, such as an Authentication Server Function (AUSF), a 5G Equipment Identity Register (EIR), a network data analytics function (NWDAF), a Non-3GPP Interworking Function (N3IWF), a Security Edge Protection Proxy (SEPP), an Unstructured Data Storage Network Function (UDSF), a Location Management Function (LMF), a Lawful Intercept Function (LIF), a binding session function (BSF), and/or other types of functions. Furthermore, while particular interfaces have been described with respect to particular function nodes in FIGS. 2A-2C, additionally, or alternatively, core network 130 may include a reference point architecture that includes point-to-point interfaces between particular function nodes.

Figure 3A:
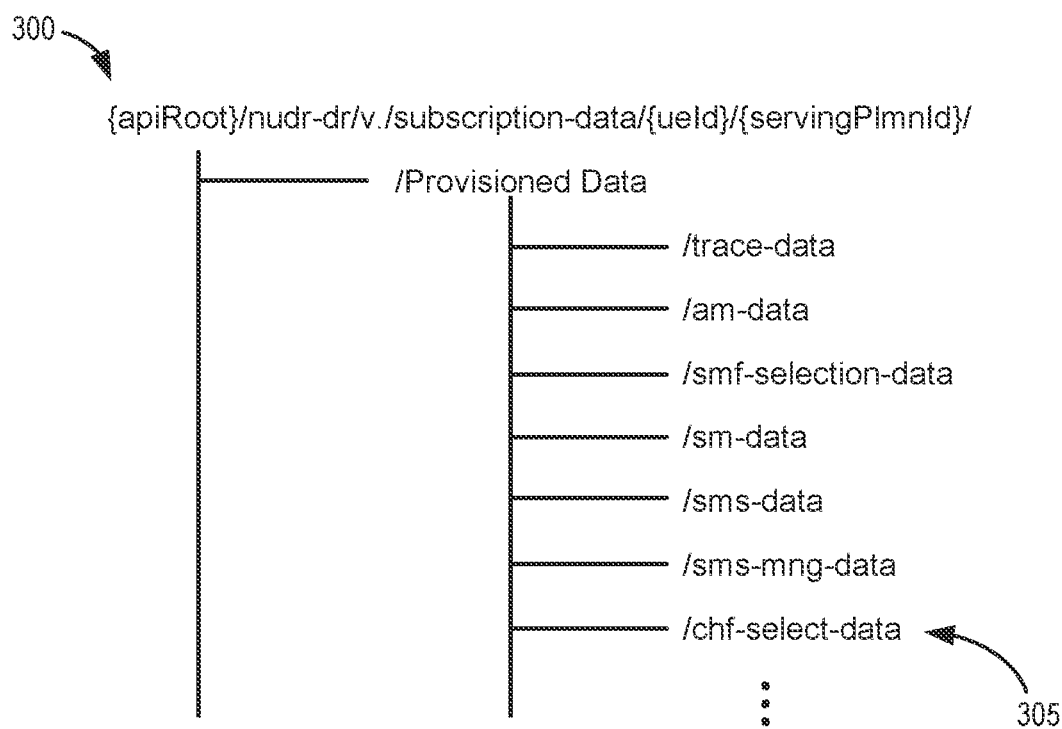
FIG. 3A is an illustration of a modified resource structure that may be used by a Unified Data Repository (UDR) function to incorporate CHF selection data.
Figure 3B:
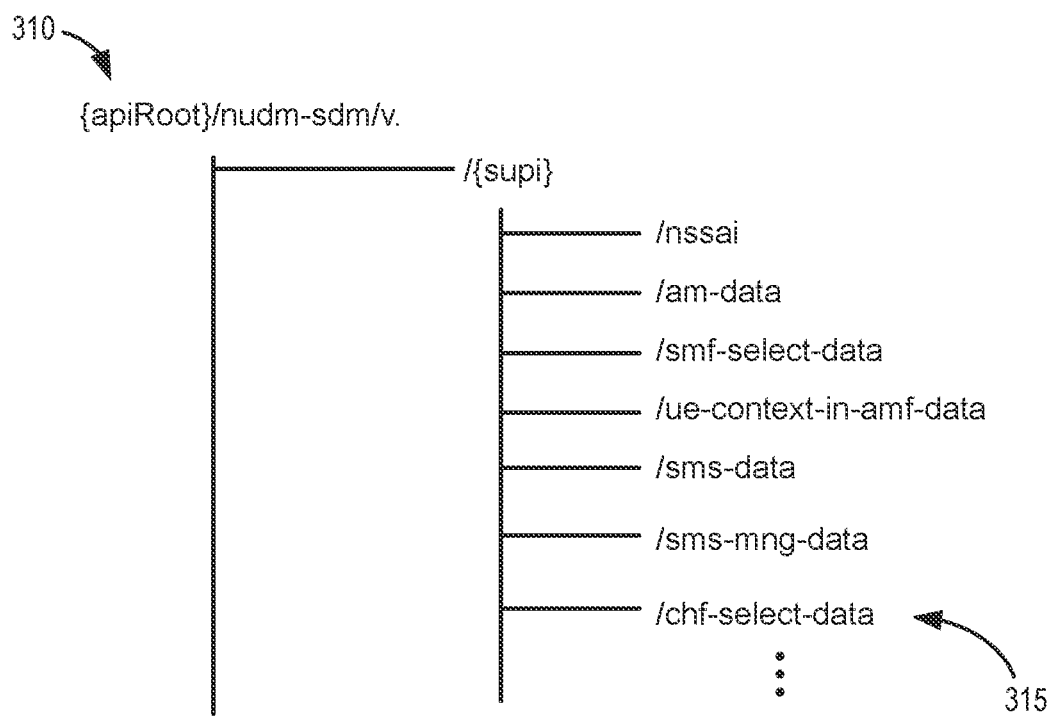
FIG. 3B is an illustration of a modified resource structure that may be used by a Unified Data Management (UDM) function to incorporate CHF selection data.

Referring to FIG. 3, UDR 252 may be provisioned with additional CHF selection data (e.g., beyond the CHF-Group-ID provided at reference 282 FIG. 2C). According to one implementation, the CHF-Group-ID may be included within the additional CHF-selection data. For example, as shown in FIG. 3A, a Nudr-dr resource structure 300 may be modified to include CHF selection data 305 (e.g., "chf-select-data"). CHF selection data 305 may include the CHF-Group-ID, for example, along with other data (e.g., shown in FIG. 4) to assist in selection of an appropriate CHF 256. Similarly, as shown in FIG. 3B, a Nudm-Session Data Management (SDM) resource structure 310 for UDM 262-1 may be modified to include CHF selection data 315 (e.g., "chf-select-data").

FIG. 4 is a table 400 illustrating examples of types of data that may be provided in CHF selection data 305 and/or CHF selection data 315. According to an implementation, table 400 may be implemented as a shared data structure between UDR 262 and UDM 252. The CHF selection data in table 400 may provide data to differentiate selection of a single CHF instance in a group of CHF 256 instances that have the same CHF-Group-ID. For example, the CHF selection data may be used not only to provide a CHF-Group-ID but also to differentiate CHF based on service type, service provider, vendor type, etc.

As shown in FIG. 4, types of data may include a service type field 402, a user type field 404, a served provider field 406, a device type field 408, a vendor identifier field 410, a charging event type field 412, a charging type field 414, a CHF-Group-ID field 416, and an extension field 418.

Service type field 402 may specify services the current CHF instance support (e.g., voice, SMS, data, etc.). User type field 404 may indicate the type of subscribers hosted on the CHF instance, such as Internet-of-Things (IOT) users, public safety users, traditional consumers, etc. Served provider field 406 may indicate the service providers hosted by the CHF instance, such as different telecommunications providers. Device type field 408 may indicate the device type of the subscribers hosted by the CHF instance (e.g., smartphone, fixed wireless access devices, IOT, etc.).

Vendor identifier field 410 may indicate the vendor/maker of the current CHF instance. Charging event type field 412 may indicate the charging events that current CHF instance processes (e.g., session-based charging, event-based charging, etc.) Charging type field 414 may indicate the type of charging processed by the current CHF instance (e.g., quota-management, offline only, etc.). CHF-Group-ID field 416 may indicate the CHF-Group-ID for the current CHF instance. Extension field 418 may be reserved for future use to provide other CHF differentiators.

FIGS. 5-10 provide examples of communications to implement regional segmentation and selection of a CHF instance. FIGS. 5-10 provide simplified illustrations of communications in the various network portions and are not intended to reflect every signal or communication exchanged between devices/functions.

Figure 5:
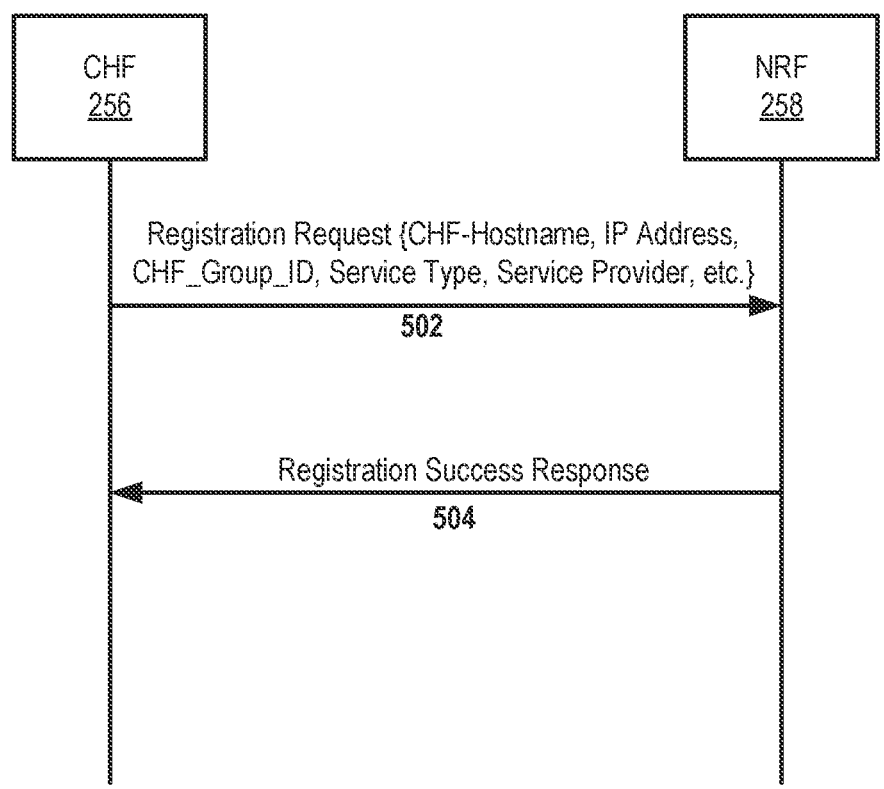
FIG. 5 is a diagram illustrating example communications to register a CHF instance with a Network Repository Function (NRF)

FIG. 5 illustrates communications in a portion 500 of core network 130 to register a CHF instance with a NRF. As shown in FIG. 5, network portion 500 may include CHF 256 and NRF 258. CHF 256 may submit a registration request 502 to NRF 258. Registration request 502 may include, for example, a CHF host name, an IP address for the CHF instance, the CHF-Group-ID, a service type (e.g., that the CHF supports), and a service provider (e.g., for the support service(s)). NRF 258 may receive registration request 502, may store the information from registration request 502 and, assuming no errors, may provide a registration success response 504 to CHF 256.

Figure 6:
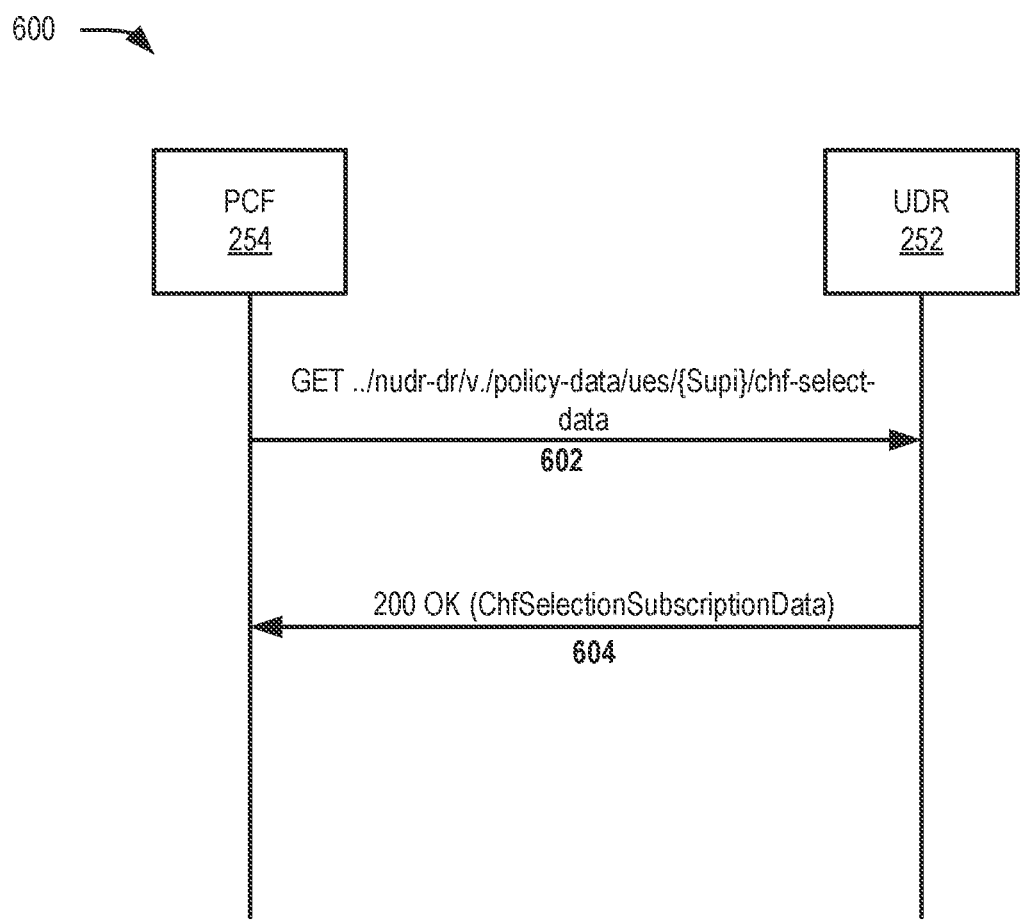
FIG. 6 is a diagram illustrating example communications for a Policy Control Function (PCF) to subscribe to CHF selection data.

FIG. 6 illustrates communications in a portion 600 of core network 130 for a PCF to subscribe to CHF selection data. As shown in FIG. 6, network portion 600 may include PCF 254 and UDR 252. PCF 254 may submit a GET request 602 to UDR 252. GET request 602 may include, for example, a Nudr data repository (dr) query to fetch CHF selection data (along with other policy data) for a particular UE (associated with a particular SUPI) requesting the PDU session. In another implementation, GET request 602 may be used to subscribe to notifications, from UDR 252, which indicate subsequent changes in subscription information for CHF selection data related to a particular SUPI. UDR 252 may receive GET request 602, may provide an acknowledgment 604 to the request, and may provide to PCF 254 the requested CHF selection data immediately and/or as updates become available. The CHF selection data may include, for example, CHF-select-data 305 (e.g., including a CHF-Group-ID).

Figure 7:
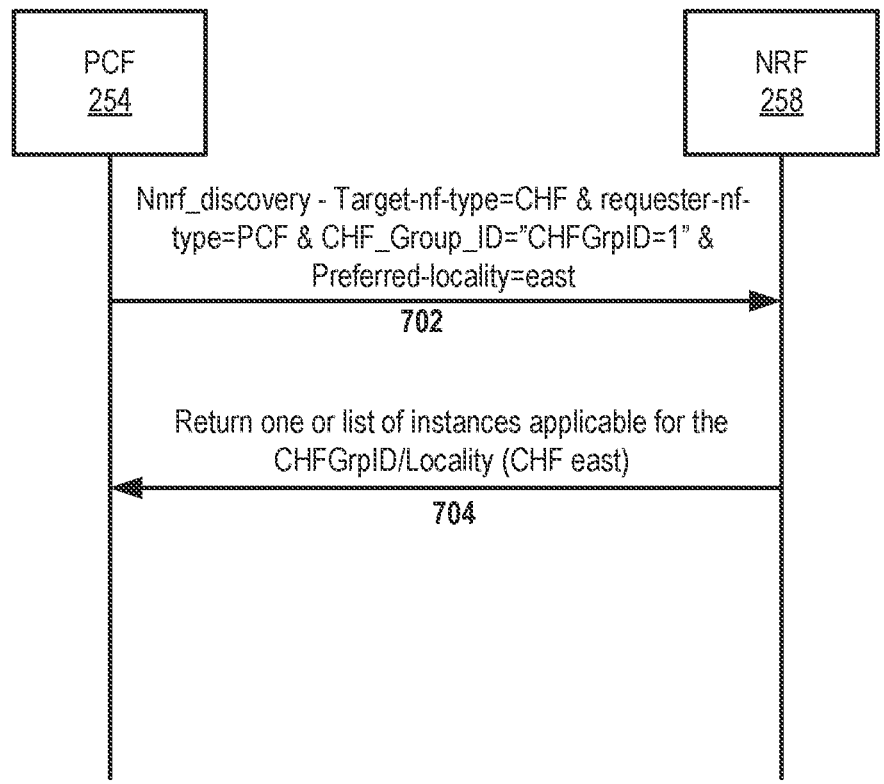
FIG. 7 is a diagram illustrating example communications for CHF discovery by a PCF.

FIG. 7 illustrates communications in a portion 700 of core network 130 for CHF discovery by a PCF. As shown in FIG. 7, network portion 700 may include PCF 254 and NRF 258. PCF 254 may submit a discovery request 702 to NRF 258. Discovery request 702 may include a particular CHF-Group-ID (e.g., "CHFGrpID=1") and indicate, for example, a preferred locality or zone (e.g., "east"). In response to discovery request 702, NRF 258 may identify one or more CHF instances applicable to the CHF-Group-ID and preferred locality. For example, NRF 258 may scan stored CHF profile data and return 704 an identifier and/or network address for corresponding CHF 256 instances.

Figure 8:
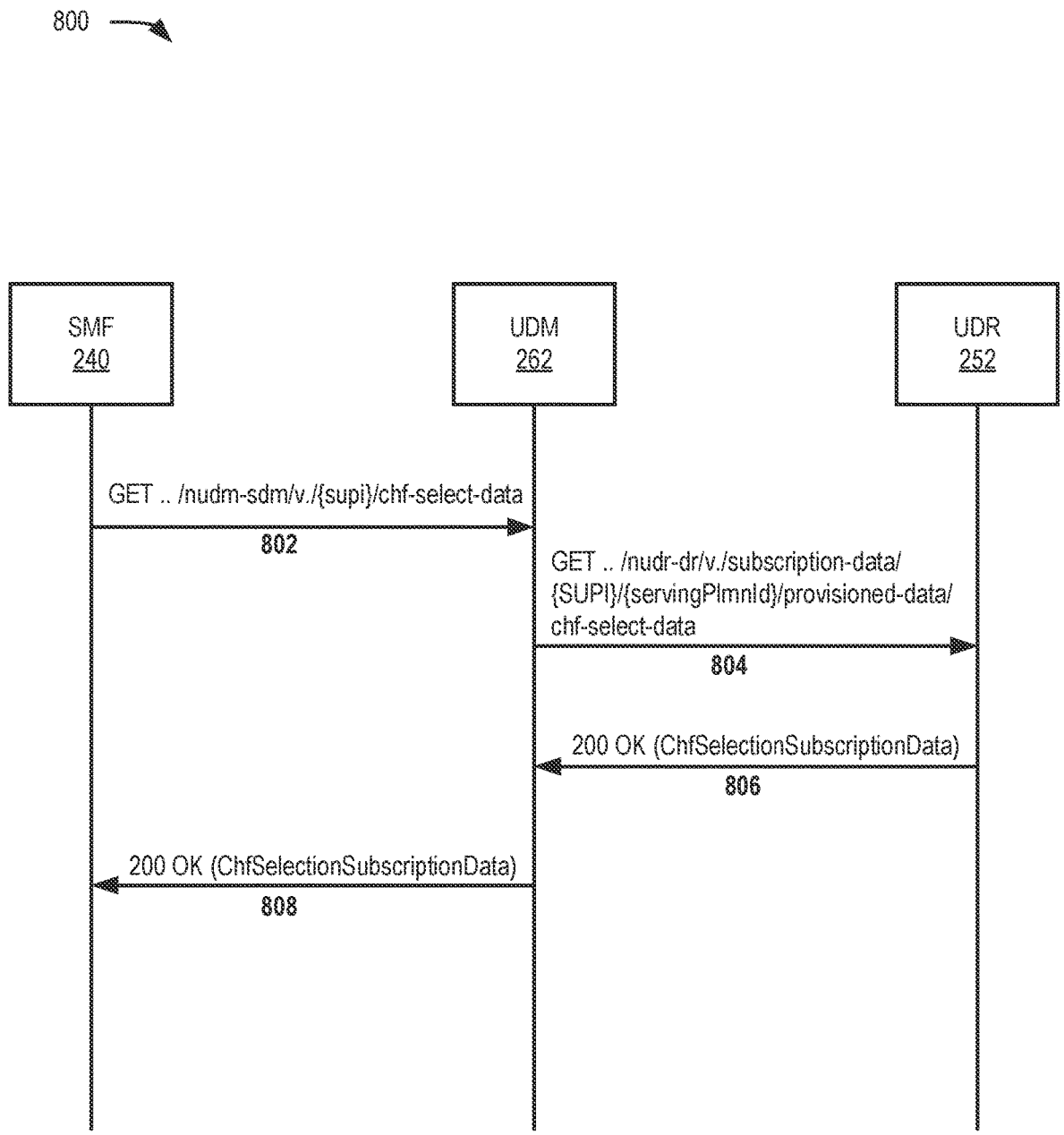
FIG. 8 is a diagram illustrating example communications for a Session Management Function (SMF) to subscribe to CHF selection data.

FIG. 8 illustrates communications in a portion 800 of core network 130 for a SMF to subscribe to CHF selection data. As shown in FIG. 8, network portion 600 may include SMF 240, UDR 252, and UDM 262. In FIG. 8, SMF 240 is illustrative of one type of CHF consumer. In other aspects, AMF 220 or SMSF 270 may engage in communications similar to those shown for SMF 240.

SMF 240 may submit a GET request 802 to UDM 262. GET request 802 may include, for example, a Nudr-dr query to fetch CHF selection data (along with other policy data) for a particular UE (or SUPI) requesting the PDU session. In another implementation, GET request 802 may be for subscribing to notifications, from UDM 262, which indicate subsequent changes in subscription information for CHF selection data related to a particular SUPI. UDM 262 may forward a corresponding GET request 804 to UDR 252. UDR 252 may receive GET request 804, may provide an acknowledgment 806 to the request, and may provide to UDM 262 the requested CHF selection data immediately and/or as updates become available. UDM 262 may receive acknowledgment 806, may provide an acknowledgment 808 to SMF 240, and may provide to SMF 240 the requested CHF selection data immediately and/or as updates become available.

Figure 9:
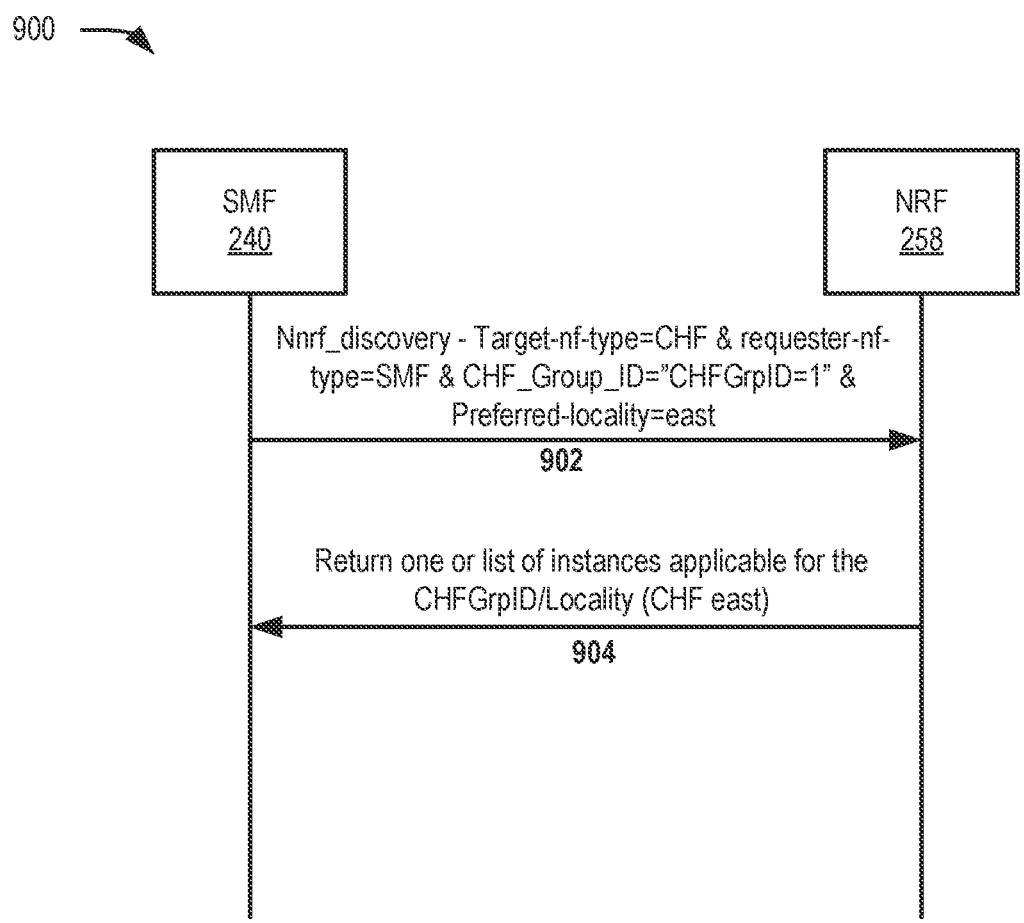
FIG. 9 is a diagram illustrating example communications for CHF discovery by an SMF.

FIG. 9 illustrates communications in a portion 900 of core network 130 for CHF discovery by an SMF. As shown in FIG. 9, network portion 900 may include SMF 240 and NRF 258. In FIG. 9, SMF 240 is illustrative of one type of CHF consumer. In other aspects, AMF 220 or SMSF 270 may engage in communications similar to those shown for SMF 240.

SMF 240 may submit a discovery request 902 to NRF 258. Discovery request 702 may include a particular CHF-Group-ID (e.g., "CHFGrpID=1") and indicate, for example, a preferred locality or zone (e.g., "east"). In response to discovery request 902, NRF 258 may identify one or more CHF instances applicable to the CHF-Group-ID and preferred locality. For example, NRF 258 may scan stored CHF profile data and return 904 an identifier and/or network address for corresponding CHF 256 instances.

Figure 10A:
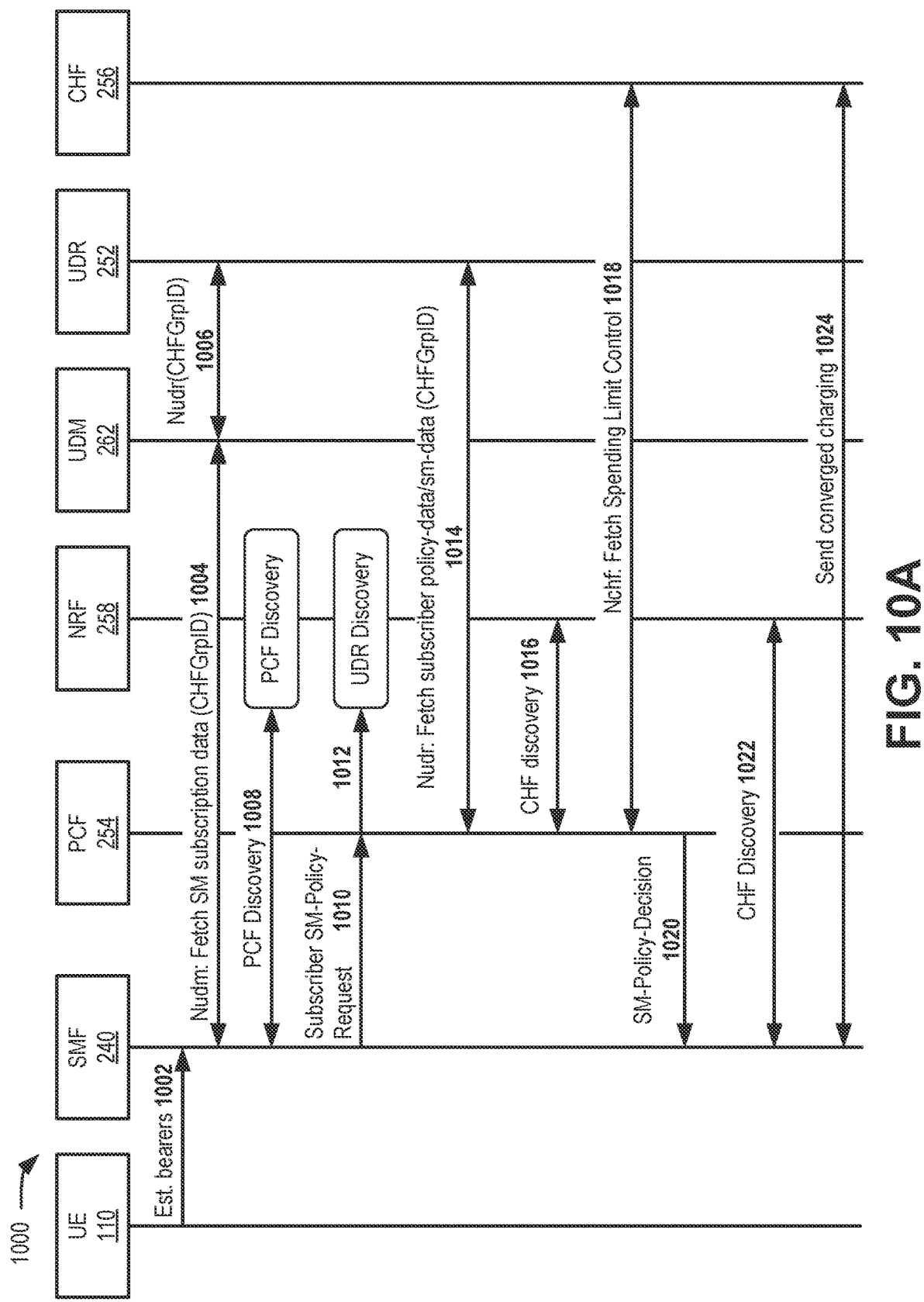
FIGS. 10A and 10B are diagrams illustrating example communications for overall call flows to implement selection of a regionally segmented CHF.
Figure 10B:
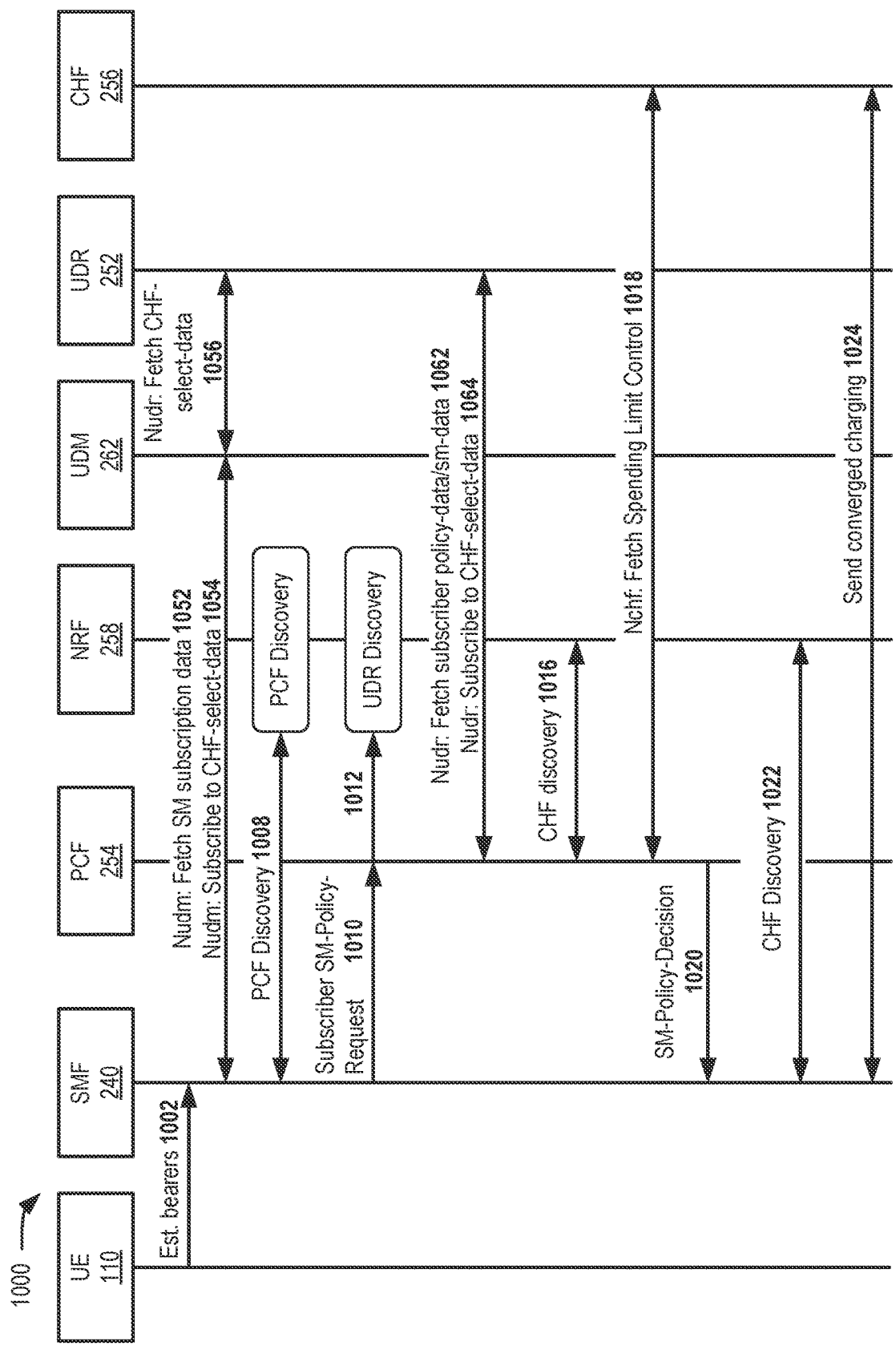

FIGS. 10A and 10B illustrate communications in a portion 1000 of core network 130 for overall call flows to implement selection of a regionally segmented CHF. In FIG. 10A a CHF-Group-ID may be pushed to different network functions as part of a subscriber profile. In FIG. 10B, a CHF-Group-ID may be provided to network functions via subscription to CHF-select-data As shown in FIGS. 10A and 10B, network portion 1000 may include UE device 110, SMF 240, UDR 252, PCF 254, CHF 256, NRF 258, and UDM 262.

Assume in FIG. 10A that UDR 252 has been provisioned with provisioning data including a CHF-Group-ID for a subscriber (e.g., FIG. 2C, 282), and that CHF 256 has performed a registration procedure (e.g., FIG. 5) with NRF 258.

Referring to FIG. 10A, UE 110 may provide a request to establish one or more bearers 1002 with SMF 240. In response, SMF 240 may obtain a CHF-Group-ID from UDR 252 via UDM 262. For example, using a Nudm interface, SMF 240 may provide an SM subscription data request 1004 with a SUPI to UDM 262. At reference 1006, UDM 262 may use the SUPI over a Nurd interface to obtain from UDR 252 provisioning data that includes a corresponding CHF-Group-ID for the subscriber, which may be returned to SMF 240.

Using the provisioning data, SMF 240 may send a PCF discovery request 1008 to NRF 258, which may provide an identifier or network address for the appropriate PCF 254 for the current PDU session. SMF 240 may send a subscriber SM policy request 1010 to PCF 254, which may cause PCF send a UDR discovery request 1012 to NRF 258.

Using the UDR identified as a result of sending UDR discovery request 1012, PCF 254 may fetch subscriber SM policy data 1014, including the CHF-Group-ID, from UDR 254. PCF 254 may initiate CHF discovery 1016 using the CHF-Group-ID and locality information for the subscriber. For example, as described above in connection with FIG. 7, NRF 258 may return identifiers for one or more corresponding CHF instances that have the matching CHF-Group-ID and locality information. Using one of the identified CHF instances, PCF 254 may fetch 1018 spending limit control information from CHF 256. Also, in response to subscriber SM policy request 1010, PCF 254 may provide as SM policy decision 1020 to SMF 240.

Using the CHF-Group-ID obtained from SM data request 1004, SMF 240 may initiate CHF discovery 1022 using the CHF-Group-ID and locality information for the subscriber. For example, as described above in connection with FIG. 9, NRF 258 may return one or more identifiers for the corresponding CHF instances with the matching CHF-Group-ID and locality information. Using one of the provided CHF instances, SMF 240 may send converged charging data 1022 for the PDU session to CHF 256. Additionally, or alternatively, AMF 220 and SMSF 270 may similarly initiate CHF discovery and send charging data to the same CHF 256 instance.

Referring to FIG. 10B, assume that UDR 252 has been provisioned with CHF-select-data (e.g., FIG. 3A, 305) that includes a CHF-Group-ID for a subscriber, and that CHF 256 has performed a registration procedure (e.g., FIG. 5) with NRF 258. In FIG. 10B, UE 110 may provide a request to establish one or more bearers 1002 with SMF 240. In response, SMF 240 may both fetch 1052 SM subscription data from UDM 262 and subscribe 1054/1056 to CHF-select-data. In the example of FIG. 10B, SM subscription data may not include a CHF-Group-ID. The CHF-Group-ID may be provided through a CHF-select-data subscription process, as described above in connection with FIG. 8, which may correspond to references 1054/1056.

Similar to description above in connection with FIG. 10A, in FIG. 10B SMF 240 may perform PCF discovery and UDR discovery at references 1008, 1010, and 1012. Using the identified UDR, PCF 254 may both fetch 1062 policy subscription data from UDR 252 and subscribe 1064 to CHF-select-data. In the example of FIG. 10B, policy subscription data may not include a CHF-Group-ID. The CHF-Group-ID may be provided through a CHF-select-data subscription process, as described above in connection with FIG. 6, which may correspond to references 1064. The remaining communications 1016, 1018, 1020, 1022, and 1024 of FIG. 10B may proceed similarly as described above in connection with FIG. 10A.

Figure 11:
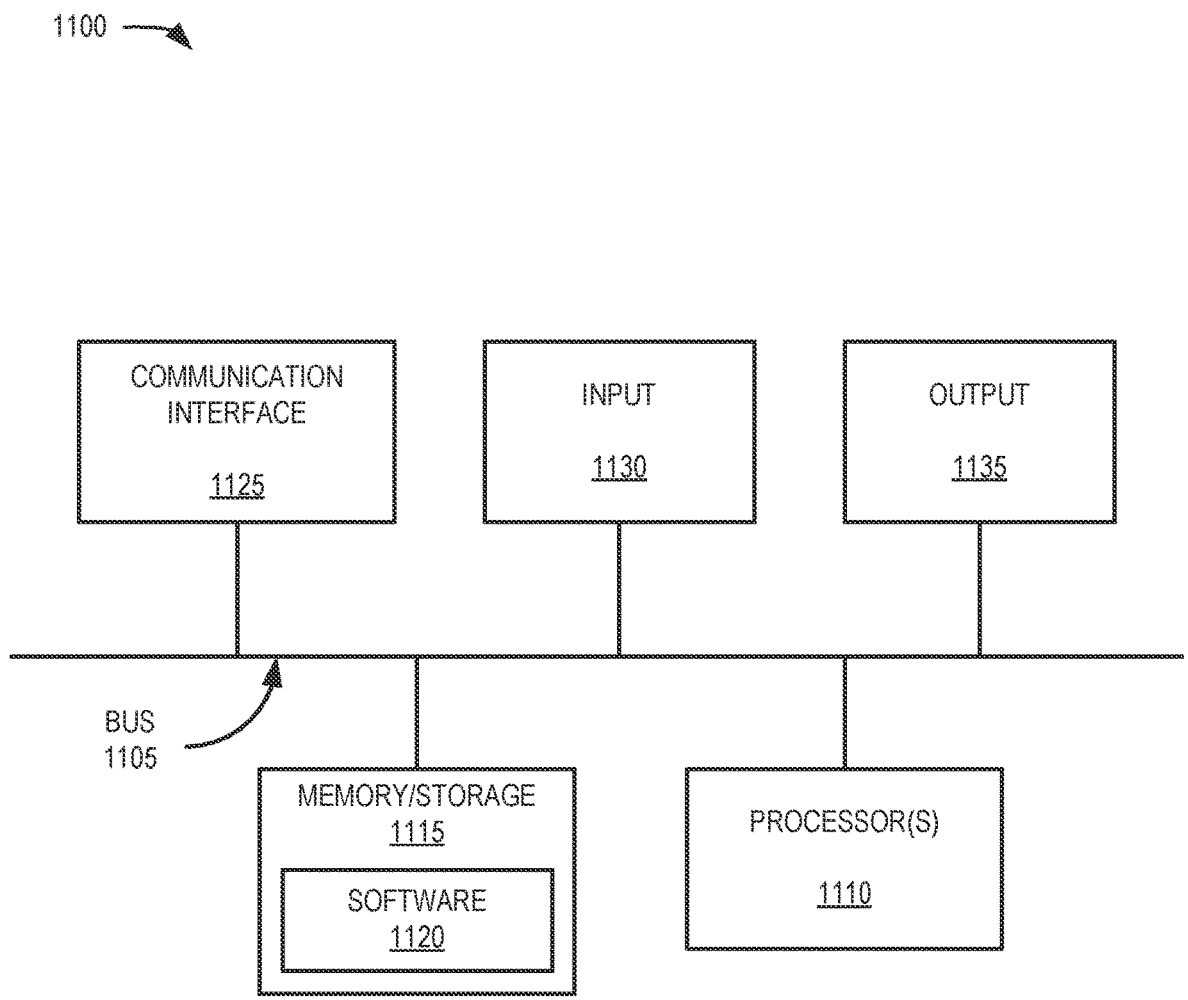
FIG. 11 is a diagram illustrating example components of a device that may correspond to one or more of the devices illustrated and described herein.

FIG. 11 is a diagram illustrating example components of a device 100 that may be included in one or more of the devices described herein. For example, device 1100 may correspond to UE 110, SMF 240, UDR 252, PCF 254, CHF 256, NRF 258, and UDM 262, and/or other types of devices, as described herein. As illustrated in FIG. 11, device 1100 includes a bus 1105, a processor 1110, a memory/storage 1115 that stores software 1120, a communication interface 1125, an input 1130, and an output 1135. According to other embodiments, device 1100 may include fewer components, additional components, different components, and/or a different arrangement of components than those illustrated in FIG. 11 and described herein.

Bus 1105 includes a path that permits communication among the components of device 1100. Processor 1110 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 1110 may be implemented as hardware (e.g., a microprocessor, etc.), a combination of hardware and software (e.g., a SoC, an ASIC, etc.), may include one or multiple memories (e.g., cache, etc.), etc.

Processor 1110 may control the overall operation, or a portion of operation(s) performed by device 1100. Processor 1110 may perform one or multiple operations based on an operating system and/or various applications or computer programs (e.g., software 1120). Processor 1110 may access instructions from memory/storage 1115, from other components of device 1100, and/or from a source external to device 1100 (e.g., a network, another device, etc.).

Memory/storage 1115 includes one or multiple memories and/or one or multiple other types of storage mediums. Memory/storage 1115 may store data, software, and/or instructions related to the operation of device 1100. Software 1120 includes an application or a program that provides a function and/or a process. Software 1120 may also include firmware, middleware, microcode, hardware description language (HDL), and/or other form of instruction. Software 1120 may also be virtualized. Software 1120 may further include an operating system (OS) (e.g., Windows, Linux, Android, proprietary, etc.).

Communication interface 1125 permits device 1100 to communicate with other devices, networks, systems, and/or the like. Communication interface 1125 includes one or multiple wireless interfaces and/or wired interfaces. For example, communication interface 1125 may include one or multiple transmitters and receivers, or transceivers. Communication interface 1125 may operate according to a protocol stack and a communication standard. Communication interface 1125 may include an antenna. Communication interface 1125 may include various processing logic or circuitry (e.g., multiplexing/de-multiplexing, filtering, amplifying, converting, error correction, application programming interface (API), etc.). Communication interface 1125 may be implemented as a point-to-point interface, a service-based interface, or a reference interface, for example. Input 1130 permits an input into device 1100. Output 1135 permits an output from device 1100.

As previously described, a network device may be implemented according to various computing architectures (e.g., in a cloud, etc.) and according to various network architectures (e.g., a virtualized function, etc.). Device 1100 may be implemented in the same manner. For example, device 1100 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in an application service layer network (e.g., external network 120) and/or another type of network (e.g., access network 130, etc.). Thus, network devices described herein may be implemented as device 1100.

Device 1100 may perform a process and/or a function, as described herein, in response to processor 1110 executing software 1120 stored by memory/storage 1115. By way of example, instructions may be read into memory/storage 1115 from another memory/storage 1115 (not shown) or read from another device (not shown) via communication interface 1125. The instructions stored by memory/storage 1115 may cause processor 1110 to perform a function or a process described herein. Alternatively, for example, according to other implementations, device 1100 performs a function or a process described herein based on the execution of hardware (processor 1110, etc.).

Figure 12:
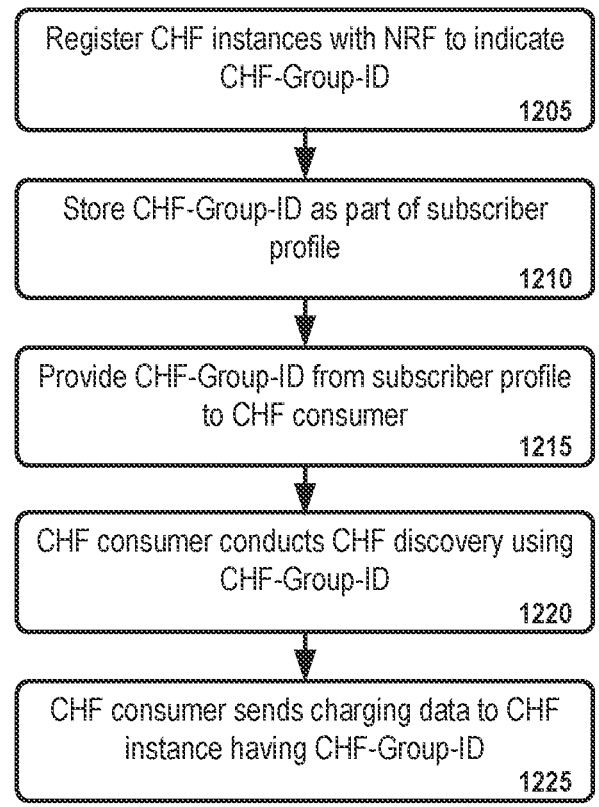
FIG. 12 is a flow diagram illustrating an example process for selecting a CHF with regional segmentation, according to an implementation described herein.

FIG. 12 is a flow diagram illustrating an example process 1200 for selecting a CHF with regional segmentation, according to an implementation described herein. In one implementation, process 1200 may be implemented by one or more components of core network 130. In another implementation, process 1200 may be implemented by components of core network 130 in conjunction with one or more other devices in network environment 100.

Process 1200 may include registering multiple CHF instances to indicate a CHF-Group-ID (block 1205). For example, a CHF 256 instance may register with NRF 258 and identify a CHF-Group-ID, such as a CHF-Group-ID associated with one of segments 138-1 or 138-2.

Process 1200 may further include storing a CHF-Group-ID as part of a subscriber profile (block 1210), and providing the CHF-Group-ID from the subscriber profile to a CHF consumer (block 1215). For example, provisioning system 280 may provide CHF selection data (including a CHF-Group-ID) to UDR 252. UDR 252 may provide the CHF selection data/CHF-Group-ID to UDM 262. During a PDU session establishment procedure, a CHF consumer (e.g., AMF 220, PCF 254, SMF 240, or SMSF 270) may request and/or subscribe to receive the CHF selection data/CHF-Group-ID, which a respective UDR 252 or UDM 262 may provide to the CHF consumer.

Process 1200 may also include conducting CHF discovery using the CHF-Group-ID (block 1220) and sending charging data to the CHF instance associated with the CHF-Group-ID (block 1225). For example, a CHF consumer may receive the CHF-Group-ID from UDR 252 or UDM 262 and may include the CHF-Group-ID in a discovery request to NRF 258. NRF 258 may return to the CHF consumer a network address (or another identifier) for a corresponding CHF instance with the matching CHF-Group-ID. The CHF consumer may then use that CHF instance to send charging data (e.g., SMS usage data, voice usage data, streaming usage data, etc.) for processing.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 12, and message/operation/deployment flows with respect to FIGS. 2C and 5-10B, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:
1. A method, comprising:
registering multiple Charging Function (CHF) instances, where the registering associates each CHF instance, of the multiple CHF instances, with one of multiple CHF group identifiers;
storing, by a first network device, CHF selection data that includes a CHF group identifier (CHF-Group-ID) associated with a subscriber;
obtaining, by a second network device that functions as a CHF consumer, the CHF-Group-ID from the first network device; and
sending, by the second network device and based on the obtaining, charging data to a CHF instance associated with the CHF-Group-ID,
wherein subscriber data stored in a CHF instance associated with the CHF-Group-ID is not replicated to another CHF instance with a different CHF group identifier of the multiple CHF group identifiers.
2. The method of claim 1, wherein the CHF-Group-ID is included within a subscriber profile.
3. The method of claim 1, wherein the second network device is part of a 5G core network.

4. The method of claim 1, wherein the second network device includes:
   a Policy Control Function (PCF),
   a Session Management Function (SMF),
   an Access and Mobility Management Function (AMF), or
   a Short Message Service Function (SMSF).

5. The method of claim 1, wherein the obtaining is performed as part of a protocol data unit session establishment procedure.

6. The method of claim 1, wherein the first network device includes one of a Unified Data Repository or a Unified Data Management function.

7. The method of claim 1, wherein the CHF selection data further identifies:
   types of services supported by the CHF instance, or
   types of subscribers hosted by the CHF instance.

8. The method of claim 1, wherein obtaining the CHF-Group-ID includes:
   sending, by the second network device and to the first network device, a subscription request for the CHF selection data; and
   receiving, by the second network device and from the first network device, updated CHF selection data based on the subscription request.

9. The method of claim 1, wherein registering the multiple CHF instances includes registering the multiple CHF instances with a Network Repository Function (NRF), the method further comprising:
   initiating, by the second network device and using the CHF-Group-ID, CHF discovery with the NRF.

10. A system comprising:
    a first network device configured to register multiple Charging Function (CHF) instances, where the registering associates each CHF instance, of the multiple CHF instances, with one of multiple CHF group identifiers;
    a second network device configured to store CHF selection data that includes a CHF group identifier (CHF-Group-ID) associated with a subscriber; and
    a third network device, acting as a CHF consumer, configured to:
       obtain the CHF-Group-ID from the second network device, and
       send, based on the obtaining, charging data to a CHF instance associated with the CHF-Group-ID; and
    the multiple CHF instances, wherein subscriber data stored in a CHF instance, of the multiple CHF instances, associated with the CHF-Group-ID is not replicated to another CHF instance, of the multiple CHF instances, with a different CHF group identifier of the multiple CHF group identifiers.

11. The system of claim 10, wherein the CHF-Group-ID is included within a subscriber profile.

12. The system of claim 10, wherein the first network device, the second network device, and the third network device are part of a 5G core network.

13. The system of claim 10, wherein the third network device includes:
    a Policy Control Function (PCF),
    a Session Management Function (SMF),
    an Access and Mobility Management Function (AMF), or
    a Short Message Service Function (SMSF).

14. The system of claim 10,
    wherein, when obtaining the CHF-Group-ID, the third network device is configured to obtain the CHF-Group-ID as part of a protocol data unit session establishment procedure.

15. The system of claim 10, wherein the second network device includes one of a Unified Data Repository or a Unified Data Management function.

16. The system of claim 10, wherein, when obtaining the CHF-Group-ID from the second network device, the third network device is further configured to:
    send, to the second network device, a subscription request for CHF selection data; and
    receive, from the second network device, updated CHF selection data based on the subscription request.

17. The system of claim 10, wherein, when obtaining the CHF-Group-ID from the second network device, the third network device is further configured to:
    send a request to the second network device to retrieve subscriber policy data, wherein the request includes a subscription permanent identifier (SUPI).

18. The system of claim 10, wherein obtaining the CHF-Group-ID from the second network device includes obtaining at least one of:
    access management (AM) subscription data,
    session management function (SMF) subscription data, or
    short message service (SMS) subscription data.

19. A non-transitory computer-readable medium containing instructions executable by at least one processor of a charging function (CHF) consumer device, the non-transitory computer-readable medium comprising one or more instructions for:
    sending, from a first network device, a request for subscriber policy data, wherein the request includes a subscription permanent identifier (SUPI);
    obtaining, from the subscriber policy data, a CHF group identifier (CHF-Group-ID); and
    sending, based on the obtaining, charging data to a CHF instance associated with the CHF-Group-ID,
    wherein subscriber policy data stored in the CHF instance associated with the CHF-Group-ID is not replicated to another CHF instance with a different CHF group identifier.

20. The non-transitory computer-readable medium of claim 19, wherein the CHF consumer device includes one of:
    a Policy Control Function (PCF),
    a Session Management Function (SMF),
    an Access and Mobility Management Function (AMF), or
    a Short Message Service Function (SMSF), and
    wherein the first network device includes one of a Unified Data Repository function or a Unified Data Management function.

* * * * *